73806    I. H. A. Hervey Skating Rink
PATENTED
JAN 28 1868
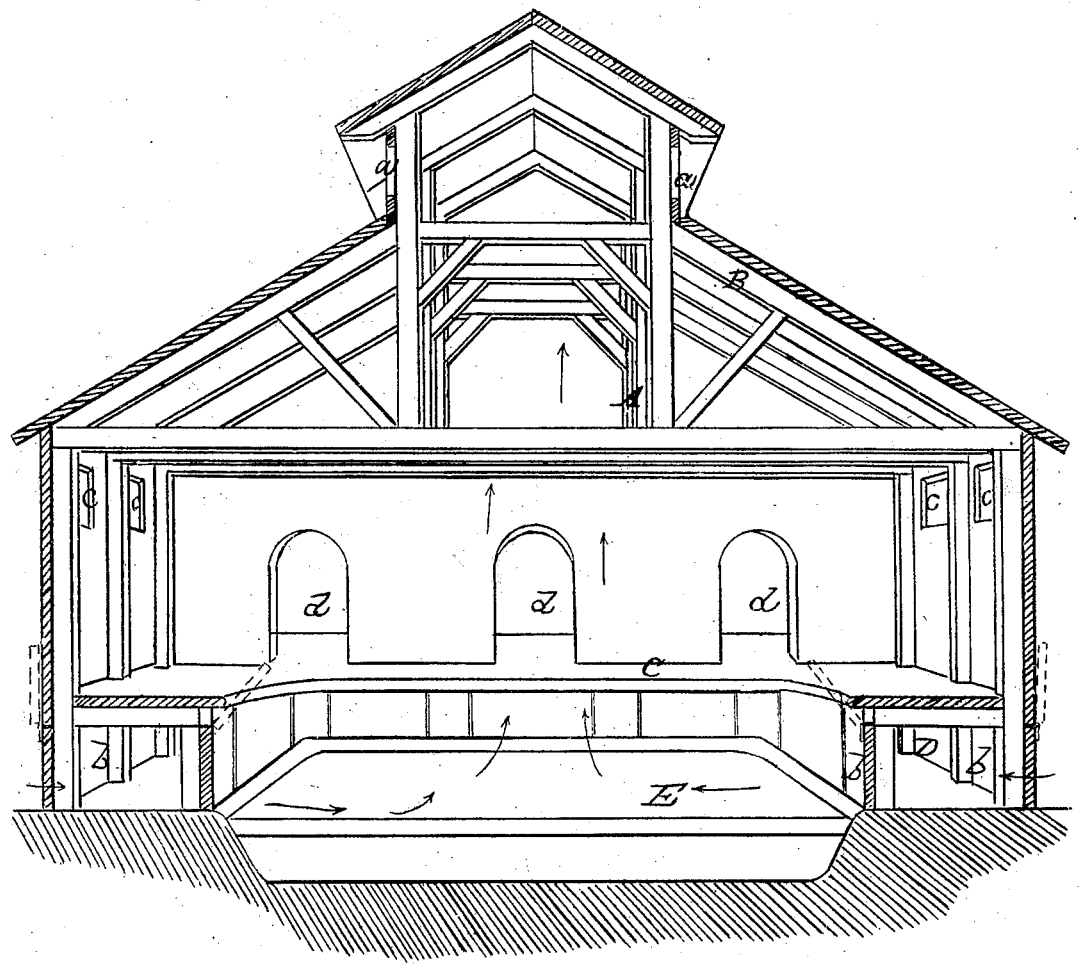
Witnesses
H. C. Halsketter
Theo Tache
Inventor
I. H. A. Hervey
per Munn & Co
Attorneys

United States Patent Office.

I. H. A. HERVEY, OF CLEVELAND, OHIO.

Letters Patent No. 73,806, dated January 28, 1868.

IMPROVED SKATING-RINK.

The Schedule referred to in these Letters Patent and making part of the same.

TO ALL WHOM IT MAY CONCERN:

Be it known that I, I. H. A. HERVEY, of Cleveland, in the county of Cuyahoga, and State of Ohio, have invented a new and improved Skating-Rink; and I do hereby declare that the following is a full, clear, and exact description thereof, which will enable others skilled in the art to make and use the same, reference being had to the accompanying drawing, forming a part of this specification.

This invention relates to a new and improved skating-rink, and has for its object the constructing the same in such a manner that perfect ventilation will be obtained, and the water within the rink allowed to freeze without any difficulty whatever, and kept in a frozen state, with a moderate temperature of the external air, the thawing or melting of the ice, either from the rays of the sun or a high temperature within the rink, being avoided, when the external air in the shade is a trifle above the freezing-point.

The invention consists in constructing the rink with openings in the roof, and admitting air into the same at it lower part, directly over the surface of the water, as hereinafter fully shown and described, whereby the desired end is attained.

The accompanying drawing represents a perspective view of my invention, the side or end of the structure nearest the eye being removed.

A represents a building, which may be constructed entirely of wood; that, at least, will probably be the material most generally used for the purpose. This building may be of any suitable dimensions, according to the size of the pond it is to cover, and its roof B, which may be of double-pitch or other form, is provided with openings, $a$, to admit of the escape of warm air.

Within the building or rink there is a platform, C, extending entirely or partially around it, and walled in at both sides, so as to form a cold-air trunk, D, which is provided, at both its inner and outer sides, with doors, $b\ b'$, at suitable distances apart.

When both the inner and outer doors are open, cold air is admitted into the rink, directly over the surface of the pond E, which covers the space included within the cold-air trunk D. The sides of the rink above the platform C may be provided with small windows or openings, $c$, for the admission of light, and they should be sufficiently high to prevent the rays of the sun from striking upon the pond or rink.

By this arrangement the cold air is admitted into the rink, directly over the surface of the water or ice, and the water will not only freeze readily and expeditiously, but, when frozen, prevented from thawing or melting readily, for the temperature within the rink may be kept as low as that of the external air, and even lower in mild, sunny days. The warm air escapes through the openings $a$, in the top of the building or roof, the direction of the current of air being shown by the arrows.

The entrances, $d$, of the rink I design to have enclosed by a portico, to prevent the admission of external air when the same is at too high a temperature. In cold weather, the doors $b\ b'$, at both sides of the cold-air chamber or trunk D, may be closed, as it is designed to have the temperature within the rink as high as may be compatible with the proper preservation of the ice.

Having thus described my invention, what I claim as new, and desire to secure by Letters Patent, is—

A skating-rink, provided with a cold-air trunk, D, extending partially or entirely around its foundation or lower part, and provided with doors, $b\ b'$, at its inner and outer sides, for the admission of external air, in connection with the openings $a$ in the roof of the rink, all constructed and arranged substantially in the manner as and for the purposes set forth.

The above specification of my invention signed by me, this 3d day of December, 1867.

I. H. A. HERVEY.

Witnesses:
GEORGE ANDERSON,
DAVID G. SCOVILLE.